Figure 1:
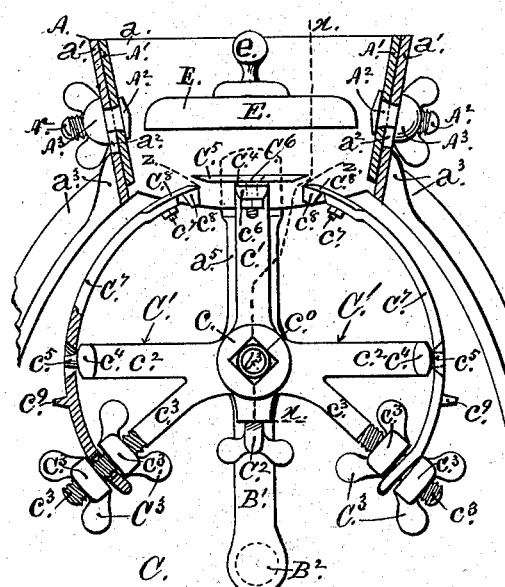

No. 719,944. PATENTED FEB. 3, 1903.
J. Y. KLINE.
VEGETABLE CUTTER OR SLICER.
APPLICATION FILED APR. 21, 1900.
NO MODEL.

WITNESSES:
Paul A. Herr.
Fred P. Metzger.

INVENTOR:
Jacob Y. Kline
BY Daniel H. Herr.
ATTORNEY.

THE NORRIS PETERS CO., PHOTO-LITHO., WASHINGTON, D. C.

UNITED STATES PATENT OFFICE.

JACOB Y. KLINE, OF FLORIN, PENNSYLVANIA, ASSIGNOR TO HIMSELF AND PARIS G. SHELLY, OF FLORIN, PENNSYLVANIA.

VEGETABLE CUTTER OR SLICER.

SPECIFICATION forming part of Letters Patent No. 719,944, dated February 3, 1903.

Application filed April 21, 1900. Serial No. 13,740. (No model.)

*To all whom it may concern:*

Be it known that I, JACOB Y. KLINE, a citizen of the United States, residing at Florin, in the county of Lancaster and State of Pennsylvania, have invented certain new and useful Improvements in Vegetable Cutters or Slicers; and I do hereby declare the following to be a full, clear, and exact description of the invention, such as will enable others skilled in the art to which it appertains to make and use the same.

This invention relates to improvements in a vegetable cutter or slicer of that class in which cutting-blades are moved underneath the opening of a bottomless hopper or feeding-receptacle mounted on approved legs or on other suitable means by which said hopper is supported at the desired height above a given surface, such as a table-top, and in which provision is made to regulate the thickness of the cut, as well as its size or shape.

The object of the invention is the production of a device to expeditiously and conveniently cut or slice potatoes for chips or other fries, cabbage for slaw, other vegetables and kindred substances for salads, and like purposes.

The elements of the invention will severally and at large appear in the following description, and they will be separately and collectively set forth or particularly pointed out in the appended claims.

The purposes of the invention are attained by the mechanism, devices, and means illustrated in the accompanying drawings, similar reference characters designating like parts throughout the several views, in which—

Figure 2:
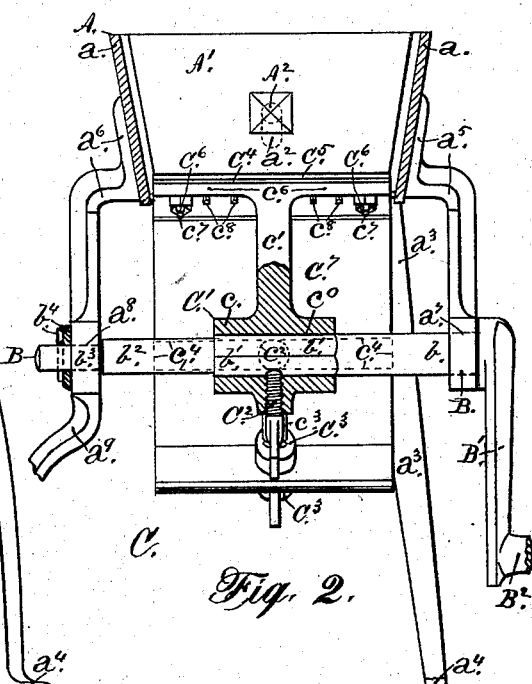
Figure 3:
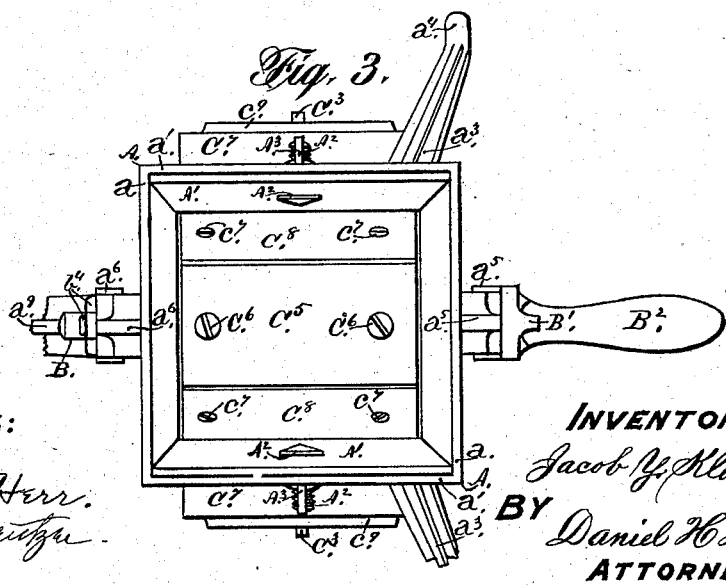

Figure 1 is a side elevation of a vegetable-cutter embodying the elements of the invention with parts appearing in central vertical section and a portion of one of the supporting-legs broken away. Fig. 2 is a sectional elevation of the same, the section being taken on the line $x\,x$ in Fig. 1 with the follower or feed block and portions of a leg and the handle removed. Fig. 3 is a top view of Fig. 2 practically completed.

Now to accomplish the invention a hopper A is provided to receive and feed the substances to be operated upon by the cutters. The hopper A is of approved dimensions, preferably rectangular in plan, consisting of four side walls arranged in opposite pairs $a\,a$ and $a'\,a'$, slightly downwardly and inwardly inclining, with their end edges securely joined or integral with each other, if made of molten metal at one casting, $a\,a$ being the front and rear end walls, and $a'\,a'$ the two side walls, the former with slightly downwardly rounded lower edges and the latter with straight ones, and the side walls $a'\,a'$ being provided at their centers with prescribed vertical slots $a^2\,a^2$ through their bodies. Movable down and up on the inner faces of these side walls are plates $A'\,A'$, with headed bolts $A^2\,A^2$ through their bodies and engaging through said slots with thumb-nuts $A^3\,A^3$ on the threaded ends of the bolts, which serve to lower or raise said plates on said side walls as well as to secure them in place, whereby the openings under these walls may be regulated at pleasure or as may be required.

To the side walls $a'$ of the hopper, at the forward ends thereof, are rigidly secured in any approved manner the upper ends of prescribed standards or legs $a^3\,a^3$, having feet $a^4$ at the lower ends thereof to stand on a table-top or other surface to which said feet may be secured, as by screws therethrough, the end walls $a$ having been exteriorly and centrally provided, rigidly affixed thereto, with depending hangers $a^5\,a^6$ of approved dimensions, having bearing-orifices $a^7\,a^8$ at their respective lower ends, through which are journaled the ends of a shaft, yet to be described, and the hanger $a^6$ below its bearing having been prolonged, downwardly and outwardly curving into the standard or leg $a^9$, having a foot similar to the feet $a^4$, before mentioned; but the lower portion of this leg, with its foot, is broken away for want of room in the drawings.

With its ends journaled in the bearing-orifices $a^7\,a^8$ is a shaft B, of prescribed dimensions, having, preferably, a right-hand end cylindrical portion $b$ of diameter equal to that of the bearing-orifice $a^7$, journaling said portion, a central angular portion $b'$ with its angular edges lying in the surface of said cylindrical portion if continued, a left-hand cylindrical portion $b^2$ of diameter not exceeding the altitude of said angular portion, and a left-hand end spindle portion $b^3$, journaled in the bearing-orifice $a^8$, with a washer and cotter-pin $b^4$ thereon, serving to secure said shaft in place, while the right-hand end of the shaft outside of the adjacent hanger is rigidly provided with a crank-arm B′, with the hub thereof engaging against said hanger, and the free end of the crank-arm is provided with a hand-grip or handle $B^2$, whereby said shaft may be oscillated, rocked, or rotated, the same being adapted to support and operate the cutting devices, yet to be described.

In the cutter device C there is mounted on the shaft B a skeleton frame or cradle C′, in which its central hub $c$ is axially provided with an angular orifice $c^0$, fitting the portion $b'$ of the shaft on which said hub is sleeved, with a set-screw $C^2$ through its body, securing it in place. Projecting centrally from the hub are radial arms $c'$ and $c^2 c^2$, with the one, $c'$, vertically disposed and the other two, $c^2 c^2$, horizontally extended, one of the latter being on either side of the former and at an angle of ninety degrees therefrom. Branching off from the hub ends of said arms $c^2 c^2$ are downwardly and outwardly inclining arms $c^3 c^3$, of a prescribed length, being provided with screw-threads the required distance at their outer or free ends, on which are mounted oppositely-disposed pairs of nuts or thumb-screws $C^3 C^3$. To the outer ends of the arms $c^3$ are rigidly affixed cross or T bars $c^4 c^4$, of prescribed dimensions, with their outer faces rounded and their centers provided with outwardly-projecting lugs or pins $c^5$, while the outer end of the arm $c'$ is provided with a cross or T bar $c^6$ of similar extent to said bars $c^4$, having a flat or level outer or top surface, on which is placed an approved filling-strip $C^4$, supporting a prescribed knife or double-edged cutting-blade $C^5$, which is secured in place as by flat-headed screws $C^6$ passing through said knife and strip and bar, with nuts on the threaded ends of said screws, the screws having their heads recessed into the body of the knife, which is thus adapted to cut either way as it is reciprocated below the hopper. On each of the bars $c^4$ of said arms $c^2$ is mounted a concavo-convex cylindrical surface plate $C^7$ of approved dimensions, and these plates have their concaved surfaces on said bars, while the pins $C^5$, freely engaging in outwardly-countersunk apertures through the bodies thereof, serve to hold the plates practically in place, but allow them to be rocked or oscillated, said bars serving as fulcra. The plates have their lower or rearward ends provided with orifices for engagement on the screw-threaded portions of said branch arms $c^3$, said ends being between the pairs of nuts $C^3$ on their respective portions and so formed or angularly bent that said nuts by being screwed home thereon will press outwardly and inwardly on opposite sides of said orifices, serving to press and hold said surface plates in close contact against their respective fulcrum-bars, as well as being adapted to oscillate or rock said plates thereon, and the plates have their forward or upper ends in close proximity to the cutting edges of said knife $C^5$ provided with knives or cutting-blades $C^8$, with their cutting edges in such positions as to freely pass the cutting edges of said former knife when moving up or down in being adjusted, while headed screws $c^7$ through the knives and plates, with nuts on their threaded ends, serve to rigidly secure said latter knives and plates together, and these knives are provided on their under surfaces, preferably at the cutting edges thereof, with vertical cutters $c^8$, rigidly secured thereto, as by brazing or welding, with prescribed intervals between them, adapted to produce rectangular strips or blocks when so desired. The plates $C^7$ are also provided exteriorly at prescribed points with outwardly-projecting ridges or ribs $c^9$ to engage against the lower end edges of the side walls $a'$ while the cradle is being oscillated to reciprocate the cutting-blades, limiting said oscillation.

To feed or press the potatoes or other substances within the hopper onto the cutters operating below the bottom thereof, a follower or press block E is placed on top of said substances, and in order that said block may be conveniently manipulated with absolute safety to the operator it is provided with a knob or handle $e$, to be gripped or controlled by the hand.

Now, the parts hereinbefore described and occupying the positions indicated in the drawings, the following observations will be noted: First, by loosening the screws $C^6$ and removing the strip $C^4$ or putting thicker strips in its place the knife $C^5$ will be lowered or raised accordingly in position, regulating the thickness of the cut or chip, or lowering the upper ends of the plates $C^7$ by means of the screws $C^3$ produces the same result; second, that by reciprocating the knife $C^5$ by rocking or oscillating the shaft B by means of the crank-arm B′ and handle $B^2$ substances within the hopper will be sliced or chipped; third, that by raising the upper ends of said plates $C^7$, as indicated by the dotted lines $z$, to points above the cutting edges of the knife $C^5$ will bring the knives $C^8$, with their vertical cutters $c^8$, into action, reducing the substances within the hopper into oblong slices or strips.

Having thus ascertained and described the invention and fully shown and set forth the manner in which it is performed, what is considered new, and desired to be secured by Letters Patent, is—

1. In a vegetable cutter or slicer having a bottomless hopper supported by standards, with hangers depending from the end walls thereof and having journal-bearings near their lower ends, with a shaft journaled through said bearings, and a crank-arm with a handle to oscillate or rock said shaft, a cutting or slicing device comprising: a cradle or frame with a central hub mounted on said shaft, said hub having three radial arms, one vertically disposed and two horizontally extended, with cross-bars at their outer ends, and branch arms extending outwardly and downwardly from the latter two of said arms, with oppositely-disposed pairs of thumb-screws on the outer ends of said branch arms; a two-edged knife secured to the top of the cross-bar of said vertically-disposed arm, and concavo-convex plates fulcrumed on the cross-bars of said horizontally-extended arms, said plates having their lower ends between the respective pairs of said screws, and their upper ends provided with cutting-blades; all substantially as described and for the purpose hereinbefore set forth.

2. In a vegetable cutter or slicer having a bottomless hopper supported above a given surface, and a cradle or frame, C, reciprocating below said hopper, said cradle having radial arms, $c^2 c^2$, with cross-bars, $c^4 c^4$, and branch arms, $c^3 c^3$, with pairs of thumb-screws, $C^3 C^3$, thereon, and concavo-convex plates, $C^7 C^7$, fulcrumed on said bars, $c^4$, with their lower ends between said screws, $C^3$, the cutting-blades, $C^8 C^8$, secured to the upper ends of said plates, $C^7$, said blades, $C^8$, having the vertical cutters, $c^8$, substantially as described and for the purpose hereinbefore set forth.

In testimony whereof I affix my signature in presence of two witnesses.

JACOB Y. KLINE.

Witnesses:
DANL. H. HERR,
FRED. P. MENTZER.